S. C. TALCOTT.

Strap-Loop.

No. 6,417. Reissued May 4, 1875.

Witnesses,
Jno. D. Patten
D. R. Cowl

Samuel C. Talcott,
By his attorneys,
Cox and Cox

THE GRAPHIC CO. PHOTO-LITH. 39 & 41 PARK PLACE, N.Y.

UNITED STATES PATENT OFFICE.

SAMUEL C. TALCOTT, OF ASHTABULA, OHIO.

IMPROVEMENT IN STRAP-LOOPS.

Specification forming part of Letters Patent No. 154,727, dated September 1, 1874; reissue No. 6,417, dated May 4, 1875; application filed March 26, 1875.

*To all whom it may concern:*

Be it known that I, SAMUEL C. TALCOTT, of Ashtabula, in the county of Ashtabula and State of Ohio, have invented certain new and useful Improvements in Strap-Loops; and I do hereby declare that the following is a full, clear, and exact description thereof, that will enable others skilled in the art to which it appertains to make and use the same, reference being had to the accompanying drawings and to the letters of reference marked thereon, which form a part of this specification.

My invention relates to what are classified as strap-loops; and has for its object the ready and convenient production of an effective means of securing buckles to metallic loops, and of attaching the loop to the material in connection with which it is used.

Figure 1:
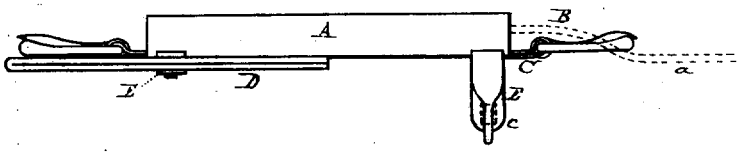
Figure 2:
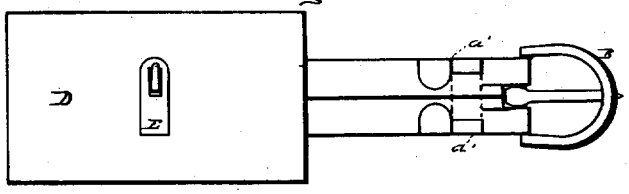
Figure 3:
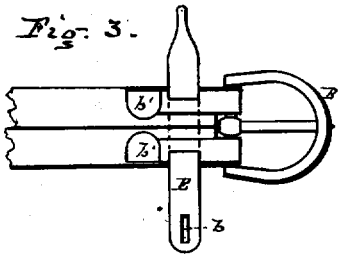
Figure 6:
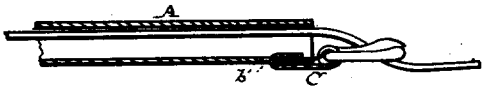
Figure 4:
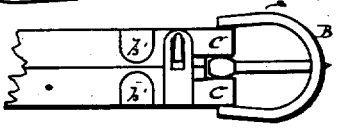
Figure 5:
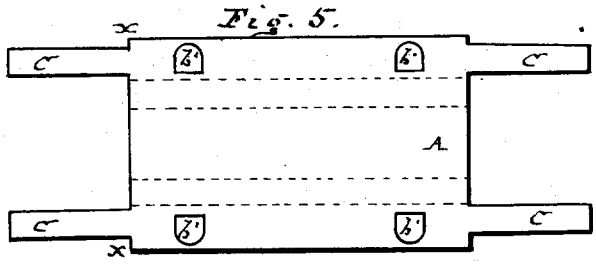

In the accompanying drawing, Figure 1 is a side view of the loop after it has been formed. Fig. 2 is an under side view of the same. Fig. 3 is a view showing the strap or tie E extended. Fig. 4 is a view showing the same when locked. Fig. 5 is a view of the blank out of which the loop is formed before it has been bent or folded. Fig. 6 is a side view in which the arrangement of the ties C is shown with other parts.

A is the loop which consists of the loop proper and the ties C. It is stamped, or otherwise formed, out of a single piece of sheet metal. The shape and construction of the blank before it is formed into loop are clearly shown at Fig. 5. C are the ties by which the buckle is fastened to the loop, and which are of such length that when carried over the tongue-bar of the buckle their extremities will be beyond the adjacent sides or edges of the apertures $b'$, so that they can be bent to form hooks, and clinched against the interior under side of the loop, as shown at Fig. 6, thus securely holding the buckle in place.

In forming the blank it is important that the projecting sides $x$ should be of such width that when they are brought in contact or contiguity with each other a suitable space will be left to accommodate the tongue of the buckle.

The manner of bending the blank is indicated at Fig. 5 by the dotted lines.

The loop is formed by means of dies, or otherwise, the angles being at the points indicated by the dotted lines, and the bending and clinching of the buckle-ties are effected in any convenient manner. E is a strap or tie of malleable metal pointed at one end, and provided with a slot, $b$, near the other. It is constructed to be passed over the lower side of the loop above the ties C, so that when folded or clamped it will enter the notches $a'$, the edge of the loop A being properly indented to permit a close fold. The operative position of the tie E is between the buckle and slots $b'$. The strap or tie E is placed upon the device, as shown at Fig. 3, when the ends, having been bent to occupy a vertical position, are forced through the curtain. They are then bent toward each other, and the tongue $a$ passed through the slot $b$ and folded back, as shown at Fig. 4, thus securely fastening the loop to the curtain.

What I claim as my invention, and desire to secure by Letters Patent, is—

1. The loop A provided with the ties C, having the notches $a'$, in combination with the tie E, constructed as specified, and arranged to operate between the buckle and slots $b'$ of the loop, all substantially as and for the purpose specified.

2. A loop, A, having ties C, constructed with relation to the slots $b'$ to be folded and bent to hold the buckle B, substantially as specified.

3. The blank shown in Fig. 5, for the uses and purposes substantially as shown and described.

In testimony that I claim the foregoing I have hereunto set my hand this 13th day of March, 1875.

SAMUEL C. TALCOTT.

Witnesses:
JAS. HENDERSON,
JONAS SMITH.